US009620275B2

United States Patent
McKinney et al.

(10) Patent No.: US 9,620,275 B2
(45) Date of Patent: Apr. 11, 2017

(54) METHOD OF CONSTRUCTING A ROTOR FOR A LINE START INTERIOR PERMANENT MAGNET MOTOR

(71) Applicant: Baldor Electric Company, Fort Smith, AR (US)

(72) Inventors: David McKinney, Hoschton, GA (US); William E. Martin, Greenville, SC (US)

(73) Assignee: Baldor Electric Company, Fort Smith, AR (US)

( * ) Notice: Subject to any disclaimer, the term of this patent is extended or adjusted under 35 U.S.C. 154(b) by 282 days.

(21) Appl. No.: 14/288,638

(22) Filed: May 28, 2014

(65) Prior Publication Data
US 2015/0349615 A1    Dec. 3, 2015

(51) Int. Cl.
| | |
|---|---|
| H02K 1/06 | (2006.01) |
| H01F 13/00 | (2006.01) |
| H02K 1/22 | (2006.01) |
| H02K 15/00 | (2006.01) |
| H02K 15/03 | (2006.01) |

(52) U.S. Cl.
CPC ........... *H01F 13/003* (2013.01); *H02K 1/223* (2013.01); *H02K 15/0012* (2013.01); *H02K 15/03* (2013.01); *Y10T 29/49014* (2015.01)

(58) Field of Classification Search
CPC .. H01F 13/003; H02K 15/0012; H02K 15/03; H02K 1/223; Y10T 29/49014
See application file for complete search history.

(56) References Cited

U.S. PATENT DOCUMENTS

| | | | | | |
|---|---|---|---|---|---|
| 23,460 | A | * | 4/1859 | Flethcer | D06F 57/125 211/115 |
| 3,521,098 | A | * | 7/1970 | Jesse | H02K 19/06 310/163 |
| 4,939,398 | A | * | 7/1990 | Lloyd | H02K 1/17 29/598 |
| 6,177,750 | B1 | * | 1/2001 | Tompkin | H02K 1/28 310/211 |
| 7,336,013 | B2 | * | 2/2008 | Pizzichil | H02K 15/0012 310/183 |
| 7,451,538 | B2 | * | 11/2008 | Pizzichil | H02K 15/0012 29/596 |
| 8,193,680 | B2 | * | 6/2012 | Fukuda | H02K 15/0012 310/211 |
| 2004/0113508 | A1 | * | 6/2004 | Yasuhara | H02K 15/0012 310/211 |
| 2006/0267441 | A1 | * | 11/2006 | Hang | B22D 19/0054 310/211 |

(Continued)

*Primary Examiner* — Minh Trinh
(74) *Attorney, Agent, or Firm* — Thompson Coburn LLP (57) ABSTRACT

A method includes: (1) providing a rotor for a line start interior permanent magnet motor wherein the rotor has rotor bars slots extending axially along a length of the rotor configured to receive rotor bar material, and magnet slots extending axially along a length of the rotor configured to receive magnetic material; (2) disposing rotor bar material in the rotor bar slots; (3) arranging a first end member on an axial end of the rotor; (4) disposing magnetic material in the magnet slots; (5) magnetizing the magnetic material; and (6) arranging a second end member on the rotor opposite the first end member. The step of arranging the second end member on the rotor occurs after magnetizing the magnetic material.

13 Claims, 10 Drawing Sheets

(56) References Cited

U.S. PATENT DOCUMENTS

2007/0062026 A1 3/2007 Pizzichil
2015/0349615 A1* 12/2015 McKinney ............ H01F 13/003
29/598

* cited by examiner

METHOD OF CONSTRUCTING A ROTOR FOR A LINE START INTERIOR PERMANENT MAGNET MOTOR

BACKGROUND

The disclosure relates to a method of constructing a line start interior permanent magnet (LSIPM) motor. In particular, the disclosure relates to methods of forming a rotor for a LSIPM and magnetizing the active magnetic region of the rotor.

DETAILED DESCRIPTION

Figure 1:
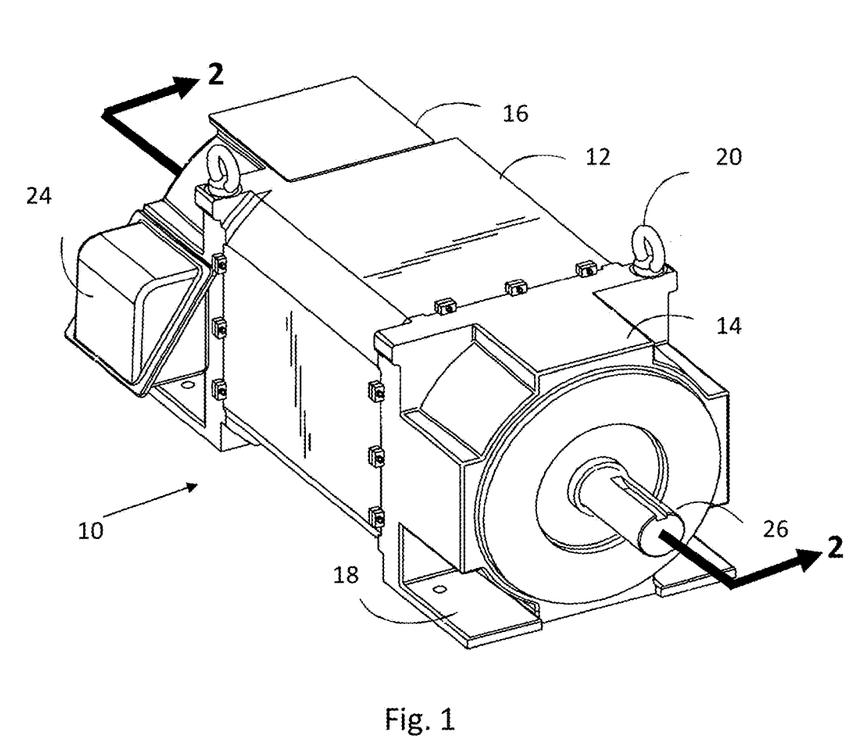
FIG. 1 is a perspective view of a line start interior permanent magnet motor (a LSIPM motor)

FIG. 1 illustrates an exemplary line start permanent magnet motor 10. The exemplary motor 10 comprises a frame 12 capped at each end by drive and opposite drive end caps 14,16, respectively. The frame 12 and the drive and opposite drive end caps 14,16 cooperate to form the enclosure or motor housing for the motor 10. The frame 12 and the drive and opposite drive end caps 14,16 may be formed of any number of materials, such as steel, aluminum, or any other suitable structural material. The drive and opposite drive end caps 14,16 may include mounting and transportation features, such as the illustrated mounting feet 18 and eyehooks 20.

To induce rotation of the rotor, current is routed through stator windings disposed in the stator. (See FIG. 2). Stator windings are electrically interconnected to form groups. The stator windings are further coupled to terminal leads (not shown), which electronically connect the stator windings to an external power source (not shown), such as 480 VAC three-phrase power or 110 VAC single-phase power. A conduit box 24 houses the electrical connection between the terminal leads and the external power source. The conduit box 24 comprises a metal or plastic material, and advantageously, provides access to certain electrical components of the motor 10. Routing electrical current from its external power source through the stator windings produces a magnetic field that induces rotation of the rotor. A rotor shaft 26 coupled to the rotor assembly rotates in conjunction with the rotor assembly.

Figure 2:
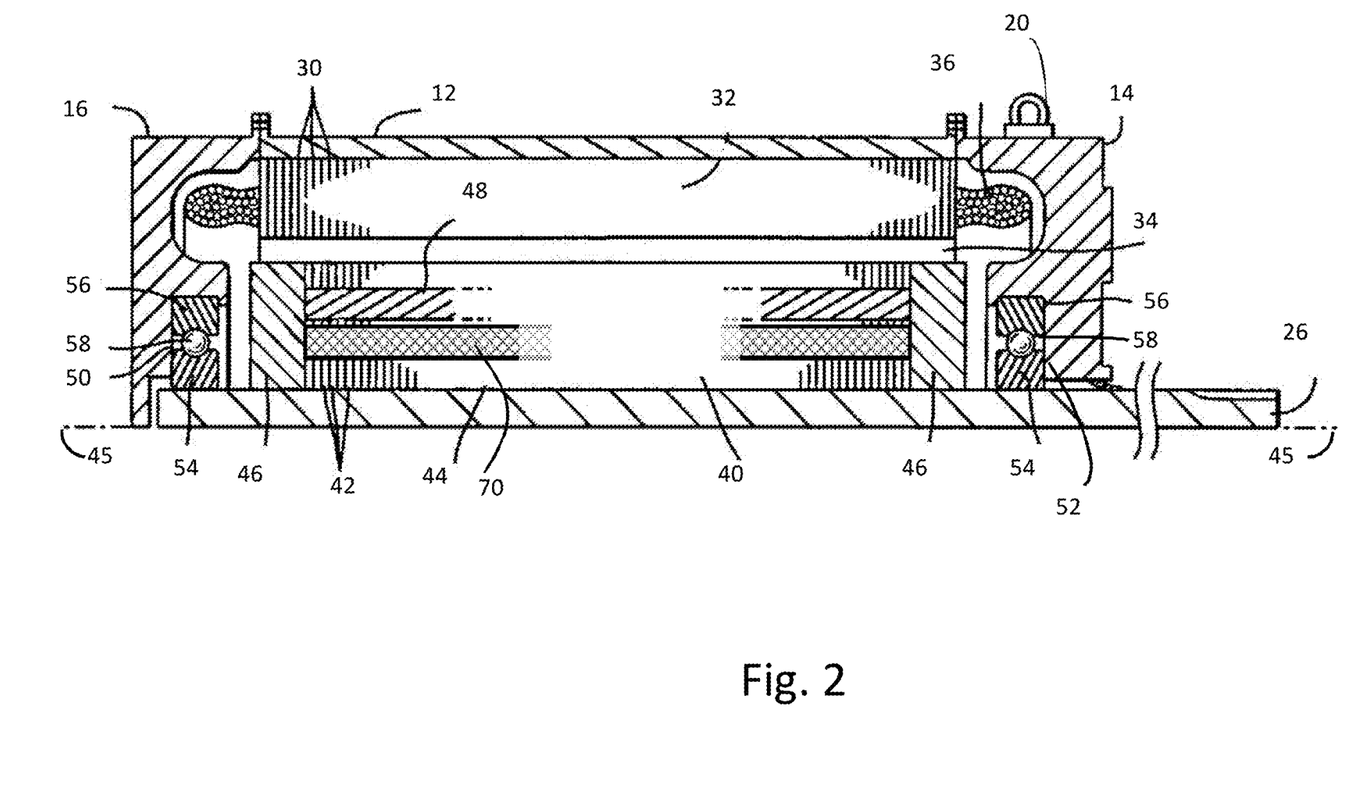
FIG. 2 is a partial cross-section view of the motor of FIG. 1 along plane 2-2.

FIG. 2 is a partial cross-sectional view of the motor 10 of FIG. 1 along plane 2-2. To simplify the discussion, only the top portion of the motor 10 is shown, as the structure of the motor 10 is essentially mirrored along its centerline. As discussed above, the frame 12 and the drive and opposite drive end caps 14,16 cooperate to form an enclosure or motor housing for the motor 10. Within the enclosure or motor housing resides a plurality of stator laminations 30 placed next to and aligned with one another to form a lamination stack, such as a contiguous stator core 32. In the exemplary motor 10, the stator laminations 30 are substantially identical to one another, and each stator lamination 30 includes features that cooperate with adjacent laminations to form cumulative features for the contiguous stator core 32. For example, each stator lamination 30 includes a central aperture that cooperates with the central aperture of adjacent stator laminations to form a rotor chamber 34 that extends the length of the stator core 32 and that is sized to receive a rotor. Additionally, each stator lamination 30 includes a plurality of stator slots disposed circumferentially about the central aperture. These stator slots cooperate to receive one or more stator windings 36, which are illustrated as coil ends in FIG. 2, that extend the length of the stator core 32. As described in more detail below, upon start-up, the stator winding is energizable with an alternating voltage to establish a rotating primary field that co-acts with the rotor bars of the starting cage to start the rotor under induction motor principles.

The rotor assembly 40 resides within the rotor chamber 34, and similar to the stator core 32, the rotor assembly 40 comprises a plurality of rotor laminations 42 aligned and adjacently placed to form a contiguous rotor core 44. When assembled, the rotor laminations 42 cooperate to form a shaft chamber that extends through the center of the rotor core 44 and that is configured to receive the rotor shaft 26 therethrough. The rotor shaft 26 is secured with respect to the rotor core 44 such that the rotor core 44 and the rotor shaft 26 rotate as a single entity about a rotor center axis 45. The exemplary rotor assembly 40 also includes electrically conductive members, such as rotor bars 48, disposed in the rotor core 44 electrically connected to rotor end members 46 to form the starting cage. The end members 46, which are disposed on opposite ends of the rotor core 44 are generally circular in cross-section and have an outer diameter that generally approximates the diameter of the rotor laminations 42. While terms "end ring" may be used the following description, it is intended that the terms refer to the structure formed on the axial ends of the rotor to support the laminations. The structure need not be annular or continuous, but may include segments with cumulative features that resemble a ring like structure. The rotor bars 48 in cooperation with the end members 46 form at least one closed electrical pathway for induced current within the rotor 40.

Accordingly, the rotor bars 48 and the end members 46 comprise materials having good electrical conductivity, such as aluminum and copper.

Each lamination 42 includes a series of rotor bar slots that are arranged at positions about the lamination such that when the laminations are assembled in a side-by-side arrangement to form the rotor core 44, the rotor bar slots cooperate to form channels for the rotor bars 48 that extend through the rotor core. The rotor bar slots are spaced radially inward from the rotor outer diameter of the lamination. The rotor bars 48 may present the same shape as the rotor bar slots to provide a tight fit for the rotor bars 48 within the rotor channels. The rotor bars may be manufactured with tight tolerances between the rotor bars 48 and the rotor bar slots, for instance, for a fabricated/swaged rotor bar design. The rotor bars may also be cast. The rotor bars 48 and end rings 46 may be made from different materials with different or similar conductivities. The rotor bars and end rings may also be made from the same material. One or both of the end rings 46 may be fabricated, and secured to the rotor bars using the methods described below. An end ring may also be cast, for instance, with the rotor bars, using the methods described below.

To support the rotor assembly 40, the exemplary motor 10 includes drive and opposite drive bearing sets 50,52, respectively, that are secured to the rotor shaft 26 and that facilitate rotation of the rotor assembly 40 within the stationary stator core 32. During operation of the motor 10, the bearing sets 50,52 transfer the radial and thrust loads produced by the rotor assembly 40 to the motor housing. Each bearing set 50,52 includes an inner race 54 disposed circumferentially about the rotor shaft 26. The tight fit between the inner race 54 and the rotor shaft 26 causes the inner race 54 to rotate in conjunction with the rotor shaft 26. Each bearing set 50,52 also includes an outer race 56 and rotational elements 58, which are disposed between the inner and outer races 54,56. The rotational elements 58 facilitate rotation of the inner races 54 while the outer races 56 remain stationary and mounted with respect to the drive and opposite drive end caps 14,16. Thus, the bearing sets 50,52 facilitate rotation of the rotor assembly 40 while supporting the rotor assembly 40 within the motor housing, i.e., the frame 12 and the drive and opposite drive end caps 14,16. To reduce the coefficient of friction between the races 54,56 and the rotational elements 58, the bearing sets 50,52 are coated with a lubricant. Although the drawings show the bearing sets 50,52 with balls as rotational elements, the bearing sets may be other constructions, such as sleeve bearings, pin bearings, roller bearings, etc.

Additionally, the rotor assembly 40 contains permanent magnetic material 70. Each of the laminations 42 may include magnet slots and the magnetic material 70 may be disposed in the magnet slots in various ways to form poles for the rotor. The magnetic material may comprise preformed solid magnets inserted into the magnet slots or a fluid type (e.g., liquid and/or solid particles) of magnetic material that may be disposed in the magnet slots. The disclosure that follows is not limited by the type or form of the magnetic material that is disposed in the magnet slots. Co-owned application Ser. No. 13/329,814, the disclosure of which is incorporated by reference herein, provides example configurations of laminations for a LSIPM motor. There may be only one magnet per slot or multiple magnets per slot. The magnetic material may be magnetized in a generally radial direction to establish alternately inwardly and outwardly disposed north and south poles on adjacent magnets. Adjacent magnets cooperate to establish alternate north and south poles on the periphery of the rotor. The rotor assembly may be constructed with any even number of poles. The magnetic material forming the magnets defines a general axis of magnetization (north or south pole) on the periphery of the rotor. The magnetic material may be Alnico, Ferrite, NdFeB, $SmCo_5$, $Sm_2Co_{17}$, or bonded Nd.

The magnetic material 70 may be installed in the rotor assembly in an un-magnetized state and then magnetized, for instance, using a magnetizing machine, in accordance with the methods described below. This allows the magnetic material to be magnetized after it is disposed in a rotor assembly of side-by-side stacked laminations. Magnetizing the magnetic material, for instance, with a magnetizing machine, after its insertion into the assembly of side-by-side stacked laminations may eliminate the need to use premagnetized magnets that are often difficult to install in a rotor assembly in view of the magnetic attraction between the magnets and the rotor core materials. Also, depending upon the desired manufacturing method, the laminations may be arranged on the rotor shaft before or after forming the rotor bars and the first end ring, and/or before and after insertion of magnetic material into the magnet slots. The disclosure that follows is not intended to be limiting with regard to the order of the steps of the insertion of the rotor shaft into the rotor core, the insertion of magnetic material into the magnet slots, or the formation of the first end ring and rotor bars.

Figure 3:
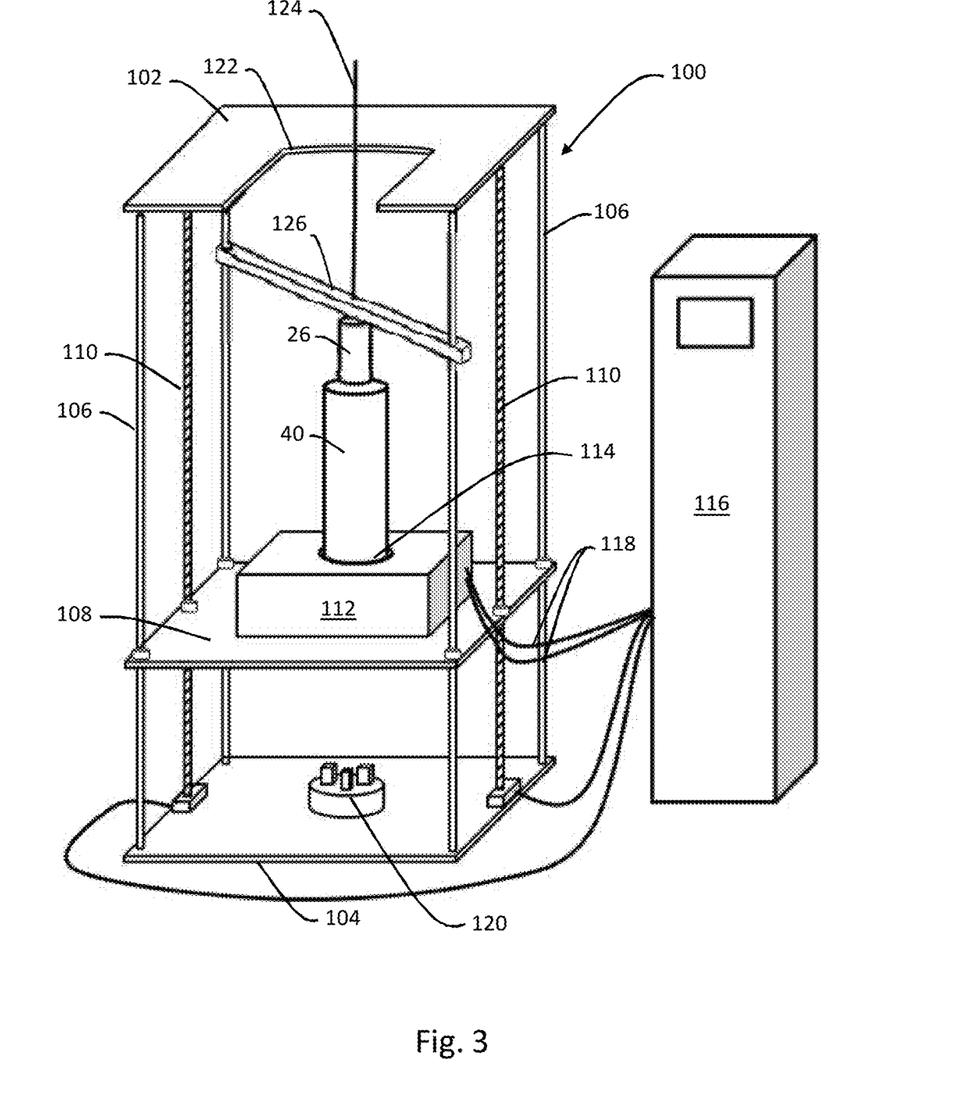
FIG. 3 is a schematic drawing of a magnetizing machine used to magnetize an active magnetic region of a rotor assembly of an LSIPM motor of the type shown in FIG. 1 wherein in FIG. 3 one end of the rotor assembly is supported by a hoist of the magnetizing machine and an opposite end of the rotor assembly is positioned within a magnetizing area of a magnetizing head of the magnetizing machine, for instance, when placing the rotor assembly in the magnetizing machine prior to magnetizing operations.
Figure 4:
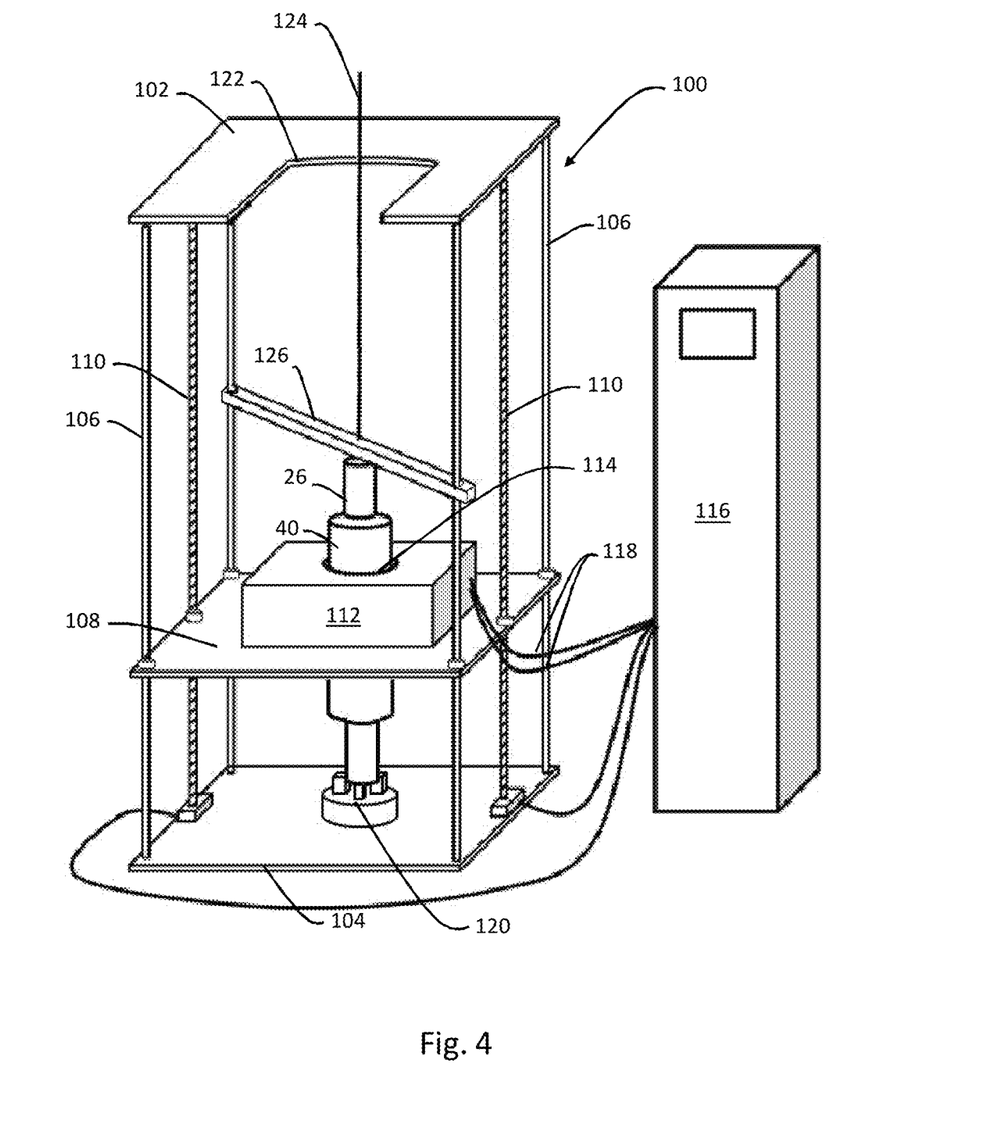
FIG. 4 is a schematic drawing of a magnetizing machine used to magnetize an active region of a rotor assembly of an LSIPM motor of the type shown in FIG. 1 wherein in FIG. 4 one end of the rotor assembly is supported by a hoist of the magnetizing machine and the opposite end of the rotor assembly is fixtured in a chuck of the magnetizing machine, for instance, during magnetizing operations.

A magnetizing machine 100 which may be used in connection with the methods described herein is shown in FIGS. 3-4. The machine shown schematically in FIGS. 3-4 is intended to be exemplary, and not limiting in any sense. Other machines capable of magnetizing magnetic material may also be used in accordance with the principles of the disclosure. Also, in the description that follows, the terms "top," "bottom," "vertical", "horizontal", "up", and "down" are used for ease of describing features as shown in the drawings, and the terms are not to be considered limiting in any sense. The magnetizing machine 100 comprises a top frame member 102 and a bottom frame member 104 with four guide rails 106 extending therebetween from corners of the respective top and bottom frame members. The guide rails 106 extend in a parallel manner to each other between the top and bottom frame members 102,104. In FIGS. 3-4, the guide rails are shown in a vertical orientation with the top and bottom frame members in a horizontal orientation. The orientation may be rotated 90 degrees from that shown in FIGS. 3-4. A fixture support plate 108 is movable between the top and bottom frame members 102,104. The guide rails 106 constrain the fixture support plate 108 for sliding motion between the top and bottom frame members 102,104 in an orthogonal direction relative to the guide rails. Actuators 110, such as ball screws or lead screws, may extend between the top and bottom frame members 102,104 to drive the fixture support plate 108 to a desired vertical position. The magnetizing machine 100 may include machine operator controls to allow the machine operator to control drives that are operatively coupled to the actuators 110. The drives may comprise drive motors that actuate the ball or lead screws. In this way, a machine operator may position the fixture support plate as desired.

The fixture support plate 108 is configured to support a magnetizing head 112 which generates a magnetic field to magnetize the magnetic material 70 of the rotor assembly. The magnetizing head may be of a type provided by Laboratorio Elettrofisico Engineering s.r.l. of Nerviano, Italy. The magnetizing head may be a high energy, external, multipolar coil provided by Laboratorio Elettrofisico Engineering s.r.l. The magnetizing head may also be a SAT Coil external coil type provided by Laboratorio Elettrofisico Engineering s.r.l. The magnetizing head 112 has a magnetizing area comprising a cavity 114 to receive all or part of the rotor assembly. The magnetizing head 112 and cavity 114 may be configured specifically for a rotor assembly to be magnetized. The magnetizing head 112 may be removably secured to the fixture support plate 108 to allow different magnetizing heads to be installed in the magnetizing machine depending upon the rotor assembly to be magnetized and the application of the LSIPM motor. The fixture support plate 108 may have a center hole (not shown) that is in register with the magnetizing head cavity 114 to allow a rotor assembly to extend through the magnetizing head and the fixture support plate, as will be explained below in greater detail. The magnetizing head 112 is electrically connected to a capacitor bank 116 with electrical connectors 118. The capacitor bank may be an impulse magnetizer, for instance, an Impulse Magnetizer Series TS provided by Laboratorio Elettrofisico Engineering s.r.l. The capacitor bank may be configured to be compatible with one or more magnetizing heads, depending upon the application. In the alternative, a specific capacitor bank may be compatible with a specific magnetizing head, depending upon the application. The capacitor bank 116 may be charged and then discharged to the magnetizing head 112 via the electrical connectors 118 to supply the impulse of magnetic energy for magnetizing the magnet material of the rotor assembly disposed in the cavity 114 of the magnetizing head.

The bottom frame member 104 has a chuck 120. The chuck 120 may be, for instance, a three-jaw, pneumatic chuck, adapted to engage the rotor shaft 26. The top frame member 102 has a cutout 122 to allow a hoist 124 to position the rotor assembly 40 in the machine 100. The rotor assembly 40 may be suspended from its rotor shaft 26 by the hoist 124 and positioned to be received in the cavity 114 of the magnetizing head 112, through the center hole of fixture support plate 108, and to be aligned in the chuck 120 of the base frame member 104. The rotor assembly 40 may be positioned in the machine 100 with the hoist 124 such that one axial end of the shaft 26 extends through the cavity 114 of the magnetizing head 112 and the opening of the fixture support plate 108 to be engaged by the chuck 120 on the bottom frame member 104 (FIG. 4). The fixture support plate 108 and magnetic head 112 may be moved as necessary to allow the free end of the rotor shaft 26 (i.e., the bottom end) to be directed through the cavity 114 of the magnetizing head 112 and to provide the machine operator with access to the bottom frame member so the operator may position the rotor shaft in the chuck and lock rotor shaft in the chuck. The chuck 120 keeps the rotor 40 in a fixed vertical position during magnetizing operations. To provide support for the axial end of the rotor assembly 40 opposite the chuck 120, a support bar 126 may be positioned between the guide rails 106 and engaged with the rotor shaft 26. Together, the chuck 120 and support bar 126 may provide two point support of the rotor assembly 40 allowing the rotor assembly to be positioned between centers of the rotor shaft 26. A tailstock member may also be used instead of the support bar to fixture the rotor shaft opposite the chuck. Once the rotor assembly 40 is fixed in position, the magnetic head 112 and fixture support plate 108 may be moved vertically around the rotor assembly to allow magnetization of the permanent magnets 70 of the rotor assembly.

Figure 5:
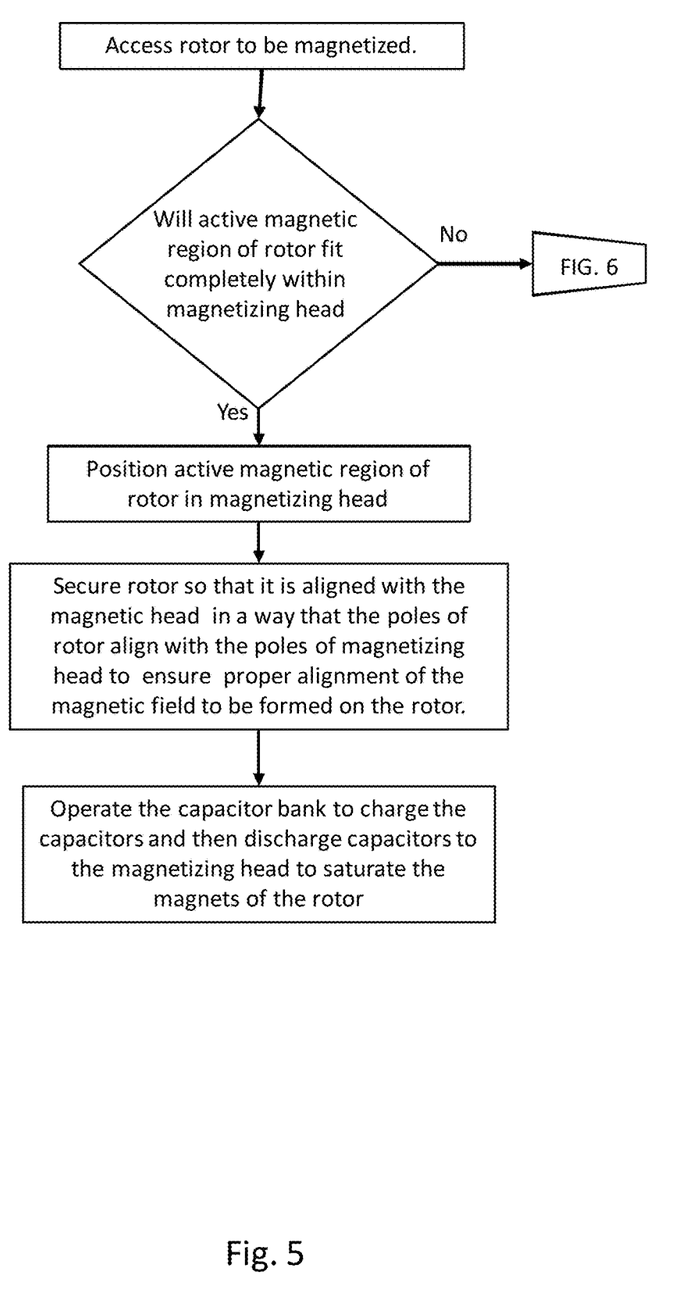
FIG. 5 is a flow chart outlining an exemplary process flow for magnetizing an active magnetic region of a rotor assembly of an LSIPM motor of the type shown in FIG. 1.
Figure 6:
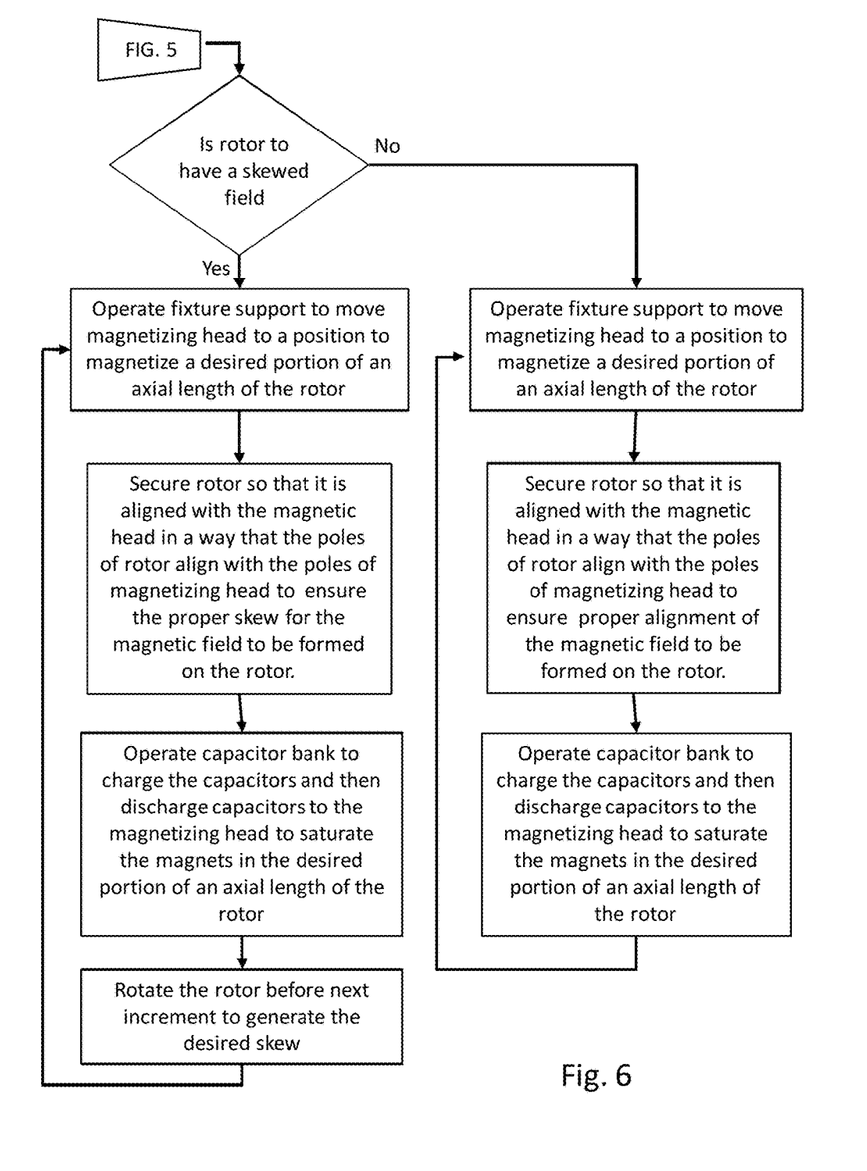
FIG. 6 is a flow chart outlining another exemplary process flow for magnetizing active magnetic regions of rotor assemblies of alternate embodiments of an LSIPM motor of the type shown in FIG. 1.

Depending upon the size of the rotor assembly 40 and the application of the LSIPM motor, several methods may be used to magnetize the permanent magnetic material or active magnetic region 70 of the rotor assembly, including by using the exemplary magnetizing machine 100 shown in FIG. 3-4. Other machines and methods of magnetizing the magnetic material of a rotor assembly may also be used in accordance with the principles of the disclosure. In the description that follows, magnetizing the magnet material in the rotor may be referred to as saturating the magnetic material. FIGS. 5-6 show exemplary process flows for magnetizing the magnetic material 70 of the rotor assembly 40 using the magnetizing machine 100. FIG. 5 is a flow chart outlining an exemplary process flow for forming a rotor of a LSIPM motor where the active region of magnetic material on the rotor assembly has an axial length that is less than the vertical height of the magnetizing head 112. In the exemplary process outlined by FIG. 5, the entire active magnetic region of the rotor may be disposed in the cavity of the magnetizing head and the region magnetized. The rotor assembly 40 and magnetizing head 112 may be aligned to provide proper saturation and to develop the correct magnetic field on the active magnetic region of the rotor. The magnetizing machine capacitor bank is operated to charge the capacitors and then discharge capacitors to the magnetizing head to saturate or magnetize the magnet material of the rotor assembly. To determine whether the magnetic material has been adequately saturated or magnetized, flux measurements of the rotor assembly may be taken and compared to specified limits.

FIG. 6 is a flow chart outlining an exemplary process flow for forming a rotor assembly of a LSIPM motor where the region of active magnetic material on the rotor assembly has an axial length that is greater than the vertical height of the magnetizing head. For rotor assemblies having an axial length of an active region of magnetic material that is greater than the height of the magnetizing head, a desired portion of an axial length of the magnetic region of the rotor may be incrementally magnetized. For instance, the magnetizing head and fixture support plate may be vertically moved to a desired position to saturate a desired portion of the axial length of the active magnetic region of the rotor assembly. After saturating a desired portion of the axial length of the active magnetic region of the rotor assembly, the magnetizing head and fixture support plate may be moved to the next incremental position to saturate another desired portion of the axial length of the active magnetic region of the rotor assembly. The rotor assembly and magnetizing head may be aligned to provide proper saturation and to develop the correct magnetic field at each incremental position along the axial length of the rotor assembly. For skewed rotor assemblies, the rotor assembly may be rotated about its center axis through a skew angle at each incremental step. The rotor assembly and magnetizing head are aligned in accordance with the skew angle to provide proper saturation and to develop the correct skew of the magnetic field at each incremental position along the axial length of the rotor assembly. To determine whether the magnetic material has been adequately saturated, flux measurements of the rotor assembly may be taken and compared to specified limits.

Figure 7:
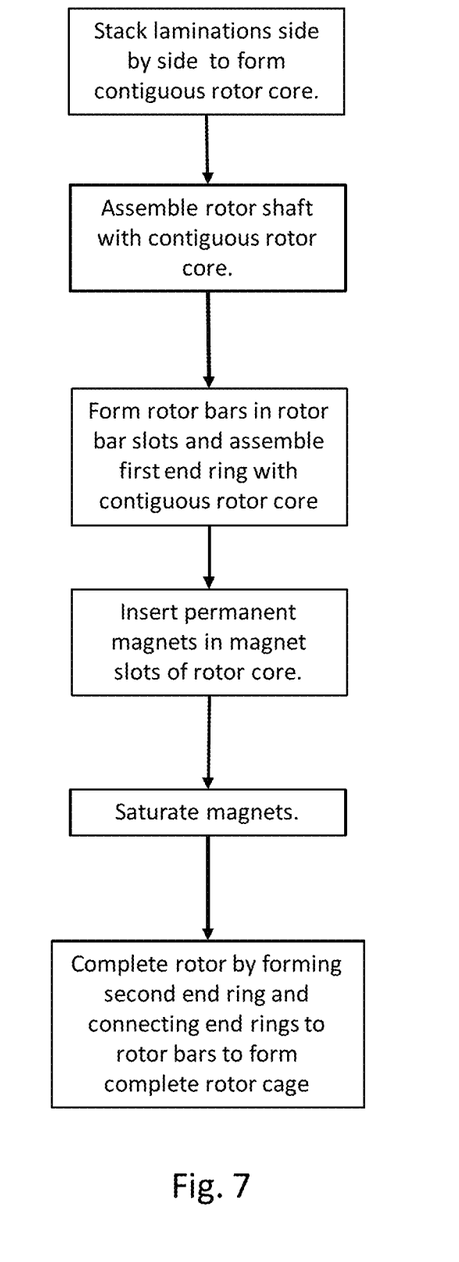
FIG. 7 is a flow chart outlining an exemplary process flow for forming a rotor assembly for one embodiment of an LSIPM motor of the type shown in FIG. 1.
Figure 8:
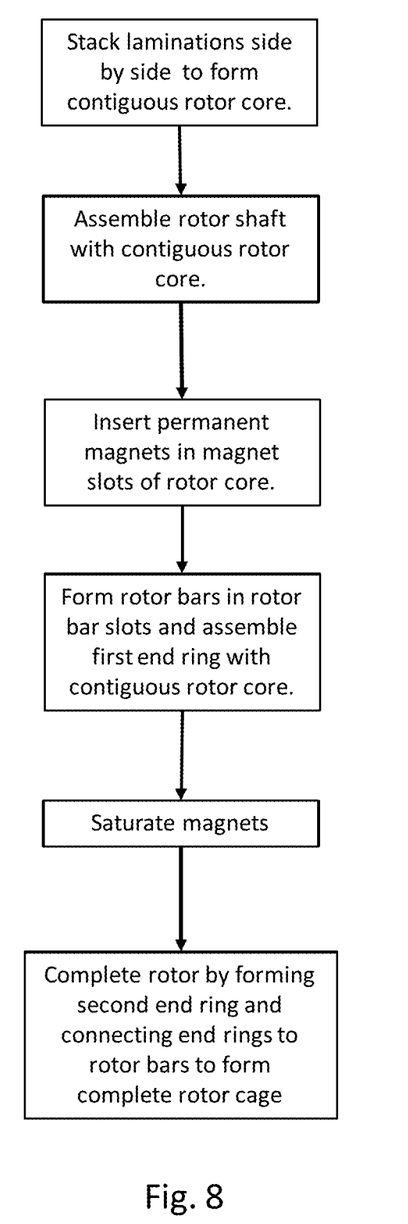
FIG. 8 is a flow chart outlining an exemplary process flow for forming a rotor assembly of another embodiment of an LSIPM motor of the type shown in FIG. 1.

Prior to magnetization of the rotor assembly, for instance, in a magnetizing machine 100 as shown in FIGS. 3-4, the rotor assembly may have its rotor cage partially formed. FIGS. 7 and 8 show exemplary process flows for forming a rotor for embodiments of a LSIPM motor. In each of the exemplary process flows of FIGS. 7 and 8, the rotor assembly comprises a partial rotor assembly, and is formed with rotor bars and only one end ring prior to magnetization. After magnetization, the opposite end ring is installed or completed to complete the rotor cage of the rotor assembly. In this way, the magnetic field generated by the magnetizing head may fully saturate the active magnetic regions of the rotor assembly without interference from the rotor cage. Installing or completing the opposite end ring after magnetization occurs may improve saturating of the magnetic material when compared to magnetization of a rotor assembly with a full cage (rotor bars and both end rings). A full rotor cage may shield the magnetic material or the active magnetic region, and not allow the magnetic material or the active magnetic region to become fully saturated. To fully saturate magnetic material that is located inside of a full cage of a rotor assembly may require a pulse of current of a relatively high magnitude and duration to overcome the shielding effect of the cage when compared to a partially formed rotor cage. With a rotor assembly having a partially formed rotor cage (e.g., one end ring and rotor bars), the pulse and duration of current to fully saturate the magnetic material or active magnetic region may be less. Manufacturing of an LSIPM motor may be more flexible with magnetization of a rotor assembly having a partial rotor cage (e.g., one end ring and rotor bars).

For instance, as shown in the process flow of FIG. 7, rotor bars and one ring may be formed in the rotor assembly prior to insertion of the magnetic material. This allows the rotor bars and one end ring to be cast before the magnetic material is inserted in the rotor core. Because the casting process may involve relatively high temperatures, casting the rotor bars and the end ring prior to magnetic material insertion may reduce the possibility of causing damage to the magnetic material from excessive heat from the casting process. During casting, the magnet slots may be filled or blocked to allow cast rotor bar material to flow only in the rotor bar slots. Because an opposite end ring is not formed on the rotor assembly during casting, the magnet slot fill or blocking material may be removed after casting to expose the magnet slots and allow the magnetic material to be inserted therein. Fabricated rotor bars, and if desired an end ring connected thereto, may also be installed in the rotor core before insertion of the magnetic material in the magnet slots of the rotor core. FIG. 8 shows a process flow where the magnetic material is inserted in the rotor assembly prior to forming the rotor bars and the one end ring. This process may prove advantageous from a manufacturing standpoint when the rotor bars and one end ring are fabricated. Insulating material may be provided to protect the magnetic material if casting methods are used to form the first end ring and rotor bars after insertion of the magnetic material in the magnet slots. That said, the process flows of FIGS. 7 and 8 are not limited in any sense by the order of the steps methods of forming the rotor bars and the one end ring, or order of the steps of the method of forming the rotor bars and the one end ring and insertion of the magnetic material.

The laminations of the rotor core may be secured on the rotor shaft so as to allow the rotor assembly to be processed without dislodging or moving the laminations from the side-by-side stacked configuration of the contiguous rotor core. Processing of the rotor may be through any of the methods described above, including insertion of a rotor assembly with a partially formed rotor cage in the magnetizing machine of FIGS. 3-4. For instance, the laminations may be held in place in the side-by-side stacked configuration with the rotor shaft, adhesive, the rotor bars, a lamination stacking arbor, threaded rods, and/or another fixturing device, which may be non-magnetic. The laminations may also be supported by the one end ring installed on the rotor assembly. In fixturing the partial rotor assembly in the magnetizing machine of FIG. 3-4, the partial rotor assembly may be arranged with the one end ring down in the machine (that is, adjacent to the chuck 120 of the bottom frame member 104) such that the top of the partial rotor assembly has the omitted or incomplete end ring. This configuration allows the weight of the laminations to rest upon the one end ring. Once the rotor assembly 40 with partial rotor cage is supported in the magnetizing machine 100 and aligned with the magnetizing head 112, magnetization may occur by any of the methods described above (i.e., full rotor saturation, incremental rotor saturation, rotor rotation and incremental rotor saturation).

Once magnetization occurs, the opposite end ring may be installed or completed to complete the rotor cage of the rotor assembly. The opposite end ring may be installed on the rotor assembly and connected to the rotor bars by soldering, welding, friction welding, brazing, ultrasonic welding, casting, or other mechanical methods (i.e., crimping, staking, mechanical deformation, heat shrinking). Insulating material may be provided between the opposite end ring and the magnetic material to protect the magnetic material during installation of the opposite end ring. For instance, an insulating plate may be disposed between the opposite end ring and the adjacent lamination to cover over the magnet holes and protect the magnets while allowing the rotor bars to extend therethrough.

Figure 9:
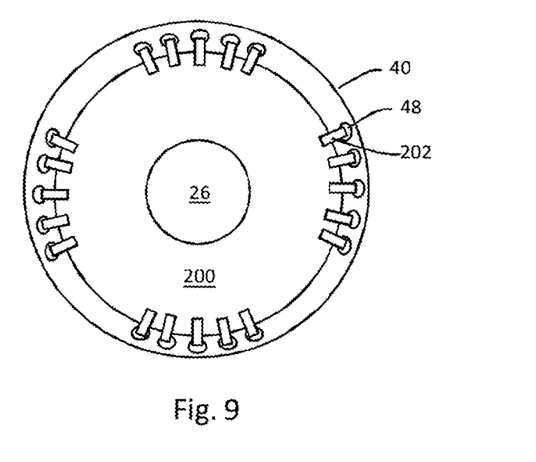
FIGS. 9-12 show embodiments of end rings that may be applied to the rotor core to complete the rotor assembly.

FIG. 9 provides an example where the opposite end ring is an omitted end ring 200 and is installed on the opposite end of the rotor 40 after saturation of the magnetic material. The omitted end ring may be cast or fabricated. Connectors 202 may extend from the ends of the rotor bars 48 projecting from the rotor 40 (for instance, the last axial lamination) to the omitted end ring 200 to complete the rotor cage of the rotor. The connectors 202 may be connected to the ends of the rotor bars 48 and the omitted end ring 200 by any of the aforementioned methods. The omitted end ring may also be cast in a manner such that the casting material envelops the ends of the rotor bars projecting from the rotor. The omitted end ring may also be fabricated and joined to the ends of the rotor bars projecting from the rotor. By way of example and not in any limiting sense, methods and techniques for installing an end ring on a rotor assembly are discussed in US Pat. App. Pub. No. 20070062026 and U.S. Pat. No. 7,336,013, the disclosures of which are incorporated by reference herein.

Figure 10:
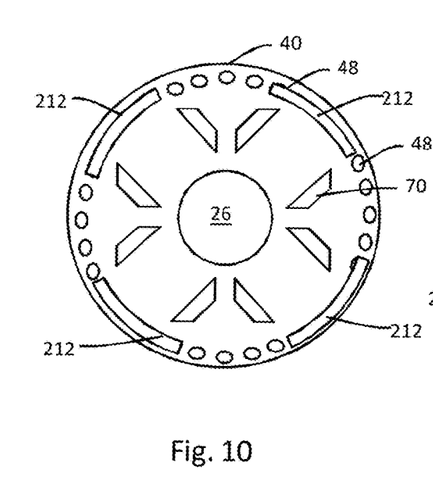
Figure 11:
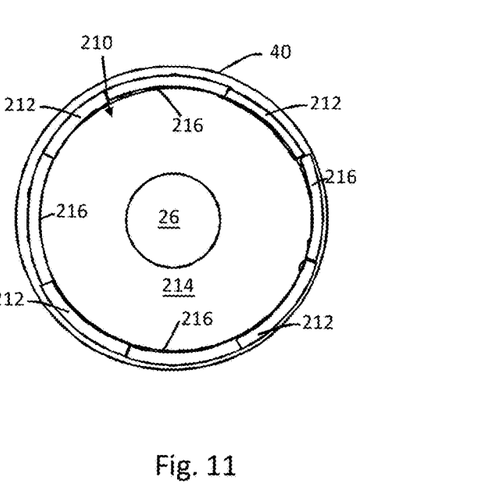

In the alternative, an opposite end ring may be initially formed with portions that are later completed or joined to form the opposite end. The incomplete portions of the opposite end ring may be formed with the first end ring and the rotor bars. The incomplete portions of the opposite end ring may be formed prior to magnetization of the magnetic material. The incomplete portions may be joined after saturation of the magnetic material to complete the rotor cage. In FIG. 10, the opposite end ring is incomplete and end ring segments 212 are formed with the rotor bars 48 and the first end ring 46. At least one of the segments may be electrically isolated from other segments. The segments 212 may be fabricated with the rotor bars or cast with the rotor bars and/or cast with the first end ring. The segments 212 are arranged to allow their joining after saturation of the magnetic material. The segments 212 may be arranged to allow insertion of magnetic material 70 into the rotor core after formation of the segments, the rotor bars, and the first end ring. The segments may also substantially cover the axial end of the rotor, for instance, when magnetic material is inserted into the magnetic slots prior to formation of the first end ring and the rotor bars. The segments may be joined to one or more rotor bars as desired but in a manner to limit any undesirable shielding effects from the partial formation of a rotor cage. After the magnetic material 70 is inserted in the magnet slots and the magnetic material is saturated, an end ring support portion 214 may be applied to the rotor shaft, as needed, and the incomplete end ring 210 may be completed by joining the segments 212, any end ring portion support 214 and the ends of the rotor bars 48 with connecting material 216, as shown in FIG. 11. The connecting material may be solder, or conductive welding, brazing, or casting material.

Figure 12:
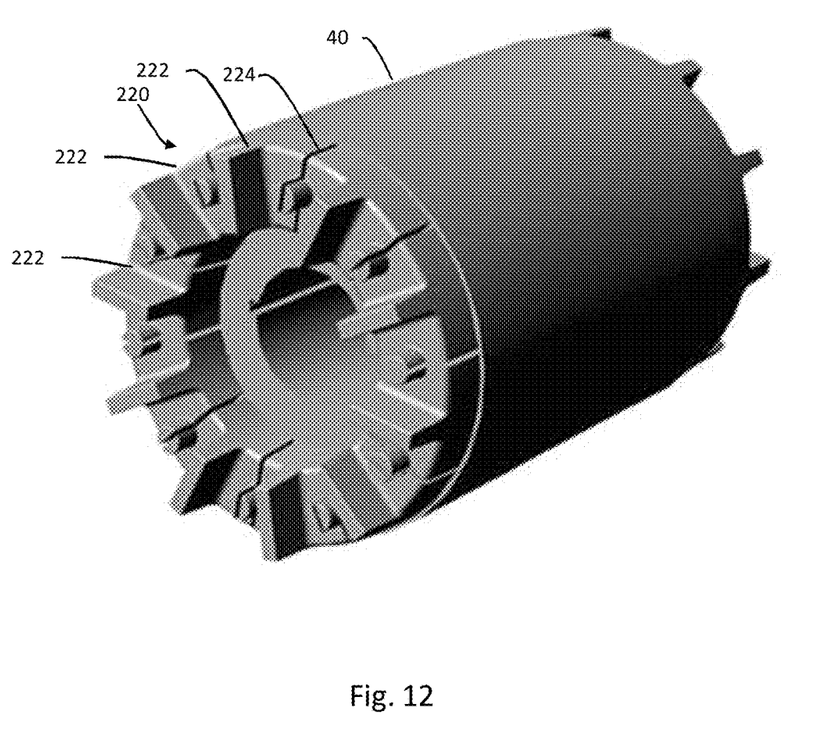

FIG. 12 provides another example of an incomplete opposite end member 220 where the opposite end ring is formed in segments 222. At least one of the segments may be electrically isolated from another segment. As shown in FIG. 12, gaps 224 are formed between adjacent segments to provide electrical isolation. The segments 222 may be joined to one or more rotor bars as desired but in a manner to limit any undesirable shielding effects from the partial formation of a rotor cage. The segments 222 may cover the axial face of the lamination more completely that the arrangement of FIGS. 10-11. Thus, the magnetic material may be disposed in the magnet slots prior to casting or assembly of the fabricated portions on the rotor. The segments may be cast with the first end ring and rotor bars. The segments may also be fabricated and joined to the rotor bars. The magnetic material may then be saturated, and the opposite incomplete end ring 220 may be completed by joining the segments 222 with connecting material. In this way, the addition of the last end ring after magnetization occurs allow for more complete saturation of the active magnetic region of the rotor assembly which may avoid effects from shielding which might otherwise occur were a rotor assembly with a full cage to undergo a magnetization process.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. While certain embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method comprising:
   providing a rotor, the rotor having rotor bars slots extending axially along the rotor configured to receive rotor bar material and magnet slots extending axially along the rotor configured to receive magnetic material;
   disposing the rotor bar material in the rotor bar slots;
   arranging a first end member on an axial end of the rotor;
   disposing the magnetic material in the magnet slots;
   magnetizing the magnetic material;
   arranging a second end member on the rotor opposite the first end member; and
   placing the second end member in electrical contact with the first end member and each of the rotor bars, wherein the step of placing the second end member in electrical contact with the first end member and each of the rotor bars occurs after magnetizing the magnetic material.

2. The method of claim 1, wherein the step of disposing rotor bar material in the rotor bar slots includes inserting fabricated rotor bars in the rotor bar slots.

3. The method of claim 1, wherein the step of arranging the first end member on an axial end of the rotor includes assembling a fabricated end member with the rotor.

4. The method of claim 1, wherein the steps of disposing the rotor bar material in the rotor bar slots and arranging the first end member on an axial end of the rotor comprise casting the rotor bars and the first end member.

5. The method of claim 1, wherein the step of disposing the magnetic material in the magnet slots occurs after disposing the rotor bar material in the rotor bar slots.

6. The method of claim 1, wherein the step of magnetizing the magnetic material includes magnetizing portions of the magnetic material along increments of an axial length of the rotor.

7. The method of claim 1, wherein the step of magnetizing the magnetic material includes applying a skew along an axial length of the rotor while magnetizing portions of the magnetic material along increments of the axial length of the rotor.

8. The method of claim 1, wherein the step of arranging the second end member on the rotor opposite the first end member includes casting the second end member.

9. The method of claim 1, wherein the step of placing the second end member in electrical contact with the first end member and each of the rotor bars includes casting the second end member.

10. The method of claim 1, wherein the step of arranging the second end member on the rotor opposite the first end member includes assembling a fabricated end ring on the rotor opposite the first end member.

11. The method of claim 1, wherein the step of arranging the second end member on the rotor opposite the first end member occurs prior to magnetizing the magnetic material.

12. The method of claim 1, wherein the step of arranging the second end member on the rotor opposite the first end member includes forming a plurality of second end member portions at least one of which is electrically isolated from other portions in the plurality of second end member portions.

13. The method of claim 12, wherein the step of placing the second end member in electrical contact with the first end member and each of the rotor bars, includes placing the plurality of second end member portions in electrical contact with each other and with the first end member and each of the rotor bars.

* * * * *